United States Patent [19]

Matsuo et al.

[11] Patent Number: 5,245,964

[45] Date of Patent: Sep. 21, 1993

[54] INTAKE PORT STRUCTURE FOR INTERNAL COMBUSTION ENGINE

[75] Inventors: Syunsuke Matsuo; Osamu Hirako; Nobuaki Murakami; Katsuo Akishino; Keizo Furukawa, all of Kyoto; Hiromitsu Ando, Okazaki; Kinichi Iwachido, Nagoya; Masayuki Motomochi, Toyota, all of Japan

[73] Assignee: Mitsubishi Jidosha Kogyo Kabushiki Kaisha, Tokyo, Japan

[21] Appl. No.: 946,476

[22] PCT Filed: Mar. 27, 1992

[86] PCT No.: PCT/JP92/00377

§ 371 Date: Nov. 10, 1992

§ 102(e) Date: Nov. 10, 1992

[87] PCT Pub. No.: WO92/17701

PCT Pub. Date: Oct. 15, 1992

[30] Foreign Application Priority Data

Mar. 28, 1991 [JP] Japan .................. 3-19358[U]
Jun. 13, 1991 [JP] Japan .................. 3-53065[U]

[51] Int. Cl.$^5$ ............................................. F02M 35/10
[52] U.S. Cl. ................................... 123/306; 123/308; 123/188.14
[58] Field of Search ............... 123/302, 306, 308, 432, 123/188.14

[56] References Cited

U.S. PATENT DOCUMENTS

| | | | |
|---|---|---|---|
| 3,945,363 | 3/1976 | Elsbett et al. | 123/188.14 |
| 4,038,950 | 8/1977 | Konomi et al. | 123/188.14 |
| 4,159,011 | 6/1979 | Sperry | 123/188.14 |
| 4,228,653 | 10/1980 | Sperry | 123/188.14 |
| 4,765,294 | 8/1988 | Katsumoto et al. | 123/188.14 |
| 4,823,753 | 4/1989 | Murakami et al. | 123/188.14 |
| 4,930,468 | 6/1990 | Stockhausen | 123/188.14 |
| 4,932,377 | 6/1990 | Lyle | 123/188.14 |

FOREIGN PATENT DOCUMENTS 63-201313  8/1988  Japan .
3-49330    5/1991  Japan .

*Primary Examiner*—Willis R. Wolfe
*Attorney, Agent, or Firm*—Wegner, Cantor, Mueller & Player

[57] ABSTRACT

This invention relates to an intake port structure for an internal combustion engine. It is an object of the present invention to increase the strength of tumbling without lowering the maximum flow rate. An intake port (44) is constructed broader in a tumblé-flow-side half (44a) than in the other half (44b) to have an intake air flow through the intake port (44) off-centered toward the side of a tumble flow, whereby an intake air flow from the intake port (44) promotes the tumble flow.

11 Claims, 18 Drawing Sheets

INTAKE PORT STRUCTURE FOR INTERNAL COMBUSTION ENGINE

TECHNICAL FIELD

The present invention relates to an intake port structure for an internal combustion engine, and particularly to an intake port structure for an internal combustion engine constructed such that an intake air flow from an intake port becomes a tumble flow in a combustion chamber.

BACKGROUND ART

To enlarge the area of an intake passage for each combustion chamber of an engine without enlargement of an intake valve, internal combustion engines provided with two intake ports per combustion chamber have been finding utility in recent years. In such an internal combustion engine, an air-fuel mixture is caused to flow into each combustion chamber through two intake ports.

Further, as means for improving combustion in an internal combustion engine, it is effective, for example, to produce a vertical swirl, i.e., a so-called tumble flow (tumble swirl) F (Fa,Fm) in a cylinder in the intake stroke as shown in FIGS. 29 and 30.

For example, FIGS. 29 and 30 show the structure of one of cylinders of a 2-intake-port internal combustion engine designed to produce such a tumble flow Fa or Fm. In the drawings, there are depicted a cylinder block 22, a cylinder bore 24, a piston 26, a cylinder head 28, and a combustion chamber 30. Also illustrated are a pentroof 34 formed in an upper wall of the combustion chamber 30, and two intake passages 40',42' provided with each cylinder. An intake port 44' of each of the intake passages 40',42' is provided with an intake valve 58.

The pentroof 34 is provided with such an inclined wall that can guide an intake air flow, which has been introduced from each intake passage 40' or 42', downwardly along an inner wall of the cylinder bore 24, said inner wall lying on an extension of an axis of the intake passage 40' or 42' While also assisted owing to the guidance by the pentroof 34, the intake air flow from the intake passage 40' or 42' therefore advances in the direction of such a tumble flow as indicated by arrow Fa or Fm.

In the illustrated example, only one of the intake passages, i.e., only the intake passage 42' is provided with an injector 12. A spark plug 10 is disposed in the vicinity of the intake port 44' of the intake passage 42' equipped with the injector 12.

To promote the tumble flow, the shape of the intake port 44' is important. In general, it is devised to straighten the flow by forming the intake port 44' into a linear, i.e., straight port as shown in FIGS. 29 and 30 or by constricting the intake port 44' as depicted in FIG. 33. In FIGS. 29 and 30, symbols 40F,42F indicate conventional intake ports which are not straight ports.

Although the cross-section of such an intake port 44' is generally formed in a circular shape as shown in FIG. 31, it may also be formed in a substantially square shape in addition to such an elliptical or oval shape as depicted in FIG. 32.

A tumble flow (tumble swirl) produced as described above is effective in increasing the flame propagation velocity and the combustion stability. Illustrative experimental data of heat release Q, cylinder pressure P and heat release rate dQ are presented in FIG. 34. Compared with the standard (the conventional construction in which no tumble flow is produced intentionally), it is understood that a tumble swirl (i.e., formation of a tumble flow) produces smaller cyclic variations in heat release Q, cylinder pressure P and heat release rate dQ and exhibits better combustion stability.

In the drawings, numeral 47 indicates an exhaust port provided in communication with an exhaust passage 60 while numeral 59 designates an exhaust valve.

Where the intake port 44' has a circular or elliptical, cross-sectional shape, formation of the intake port 44' as a straight port to make the tumble flow stronger, however, results in the structure that the intake port 44' extends at an acute angle relative to a valve seat 62 and the cross-sectional area of the flow passage obviously becomes smaller. Further, constriction of the intake port 44' as depicted in FIG. 33 obviously results in a reduction in the cross-sectional area of the flow passage, leading to a reduction in the maximum flow rate. In other words, the strength of a tumble flow (the strength of tumbling) and the maximum flow rate (flow coefficient) are in such a contradictory relationship that the latter decreases as the former increases. Such a decrease in the maximum flow rate leads to a reduction in the full-open performance of the engine and, hence, is not preferred.

To strengthen the tumble flow, incidentally, the flow rate (flow velocity) of a flow on a side of the tumble flow, aid flow being an upper flow in the intake port relative to a central axis of the intake valve 58 as a boundary (see arrow a in FIGS. 29 and 33), is required to be greater than the flow rate (flow velocity) of a flow on an opposite side (see arrow b in FIGS. 29 and 33).

If such an imbalance in flow rate (flow velocity) can be positively developed, the strength of a tumble flow (the strength of tumbling) can be increased without lowering the maximum flow rate (flow coefficient).

With a view toward achieving reductions in both vibrations and gas mileage by operating an internal combustion engine on an air-fuel mixture leaner than the stoichiometric air/fuel ratio, internal combustion engines equipped with two intake ports and fed with an air-fuel mixture through both the intake ports have also been proposed in recent years. As a spark plug is positioned between the two intake ports in the above case, operation on a small amount of fuel is accompanied by the potential problem that the ignition may be impaired. This has posed the inconvenience that the engine is difficult to operate on a smaller amount of fuel.

DISCLOSURE OF THE INVENTION

With the foregoing problems and inconvenience in view, the present invention has been completed. An object of this invention is to provide an intake port structure for an internal combustion engine, which intake port structure makes it possible to increase the strength of a tumble flow (the strength of tumbling) without lowering the maximum flow rate (flow coefficient) and also to operate the internal combustion engine on an air-fuel mixture leaner than the stoichiometric air-fuel mixture without deterioration in ignition.

An intake port structure according to a first invention, said structure being suited for use in an internal combustion engine constructed so as to make an intake air flow from an intake port become a tumble flow in a combustion chamber, characterized in that the intake port is broader in a tumble-flow-side half thereof than in the other half and an intake air flow through the intake port is off-centered toward a side of the tumble flow, whereby the intake air flow from the intake port can promote the tumble flow.

In this case, it is preferred to form the intake port broader in the tumble-flow-side half than in the other half to have a substantially triangular cross-section, to form the intake port broader in the tumble-flow-side half than in the other half to have a cross section in the form of a baseball home plate, or to form the intake port broader in the tumble-flow-side half than in the other half to have a tongue-shaped cross-section. It is also preferred to form the intake port broader in the tumble-flow-side half than in the other half so that a broadest part of the intake port is disposed at a position biased outwardly of a cross-sectional center of a valve stem at a position where the valve stem is internally in contact with the intake port and the intake port becomes gradually narrower from the broadest part toward an end portion thereof on a side of the other half.

An intake port structure according to a second invention, said structure being suited for use in an internal combustion engine constructed to cause intake air flows from corresponding plural intake ports to become a tumble flow in a combustion chamber, characterized in that the intake ports are broader in tumble-flow-side halves thereof than in the other halves and intake air flows through the respective intake ports are off-centered toward a side of the tumble flow, whereby the intake air flows from the respective intake ports can promote the tumble flow; at least one of the intake ports is provided with a partition to divide the interior thereof along the direction of a flow of a fluid therethrough into two sections, one being on a side of ignition means in the combustion chamber and the other on a side opposite to the ignition means; and fuel feed means for feeding fuel is arranged in the intake port, which is divided by the partition, on a side of the ignition means.

In this case, it is preferred to form the intake ports broader in the tumble-flow-side halves than in the other halves to have substantially triangular cross-sections, respectively; to form the intake ports broader in the tumble-flow-side halves than in the other halves to have cross-sections in the form of a baseball home plate, respectively; or to form the intake ports broader in the tumble-flow-side halves than in the other halves to have tongue-shaped cross-sections, respectively.

In the above case, all the intake ports may be provided with the partition or some of the intake ports may be provided with the partition.

According to the above-described intake port structure for the internal combustion engine, said structure pertaining to the first invention, the intake port is broader in the tumble-flow-side half thereof than in the other half and the intake air flow through the intake port is off-centered toward the side of the tumble flow. Therefore, an intake air flow fraction from the tumble-flow-side half of the intake port, said fraction being a flow fraction acting to form the tumble flow, becomes stronger while an intake air flow fraction from the other half of the intake port, said latter fraction acting as a fraction to suppress the tumble flow, becomes weaker, whereby the strength of the tumble flow can be increased without reducing the cross-sectional area of the flow passage in the intake port. As a consequence, advantages can be obtained, including improvements in motoring gas mileage and improvements in driving limits. By forming the intake port broader in the tumble-flow-side half than in the other half to have a substantially triangular cross-section, a cross-section in the form of a baseball home plate, or a tongue-shaped cross-section, the shape of the intake port capable of bringing about the above-described advantages can be defined rather easily. By forming the intake port broader in the tumble-flow-side half than in the other half so that the broadest part of the intake port is disposed at the position biased outwardly of the cross-sectional center of the valve stem at the position where the valve stem is internally in contact with the intake port and the intake port becomes gradually narrower from the broadest part toward the end portion thereof on the side of the other half, the shape of the intake port capable of bringing about the above-described advantages can be defined rather easily and, moreover, efficiently.

According to the above-described intake port structure for the internal combustion engine, said structure pertaining to the second invention, the intake port is broader in the tumble-flow-side half thereof than in the other half and the intake air flow through the intake port is off-centered toward the side of the tumble flow. Therefore, an intake air flow fraction from the tumble-flow-side half of the intake port, said fraction being a flow fraction acting to form the tumble flow, becomes stronger while an intake air flow fraction from the other half of the intake port, said latter fraction acting as a fraction to suppress the tumble flow, becomes weaker. The interior of at least one intake port (all the intake ports or some of the intake ports) is divided into two sections, one being on the side of the ignition means and the other on the side opposite to the ignition means, whereby feeding of fuel on the side of the ignition means makes it possible to stratify the fuel. Accordingly, a gas-fuel mixture rich in the fuel can be fed to the ignition means so that a gas-fuel mixture containing fuel in a smallest amount per the entire combustion chamber can be fed without impairing the ignition. As a result, the simple structure can increase the strength of a tumble flow (the strength of tumbling) without lowering the maximum flow rate (flow coefficient) and, in addition, permits operation of an internal combustion engine on an air-fuel mixture leaner than a stoichiometric air-fuel mixture without impairing the ignition.

BRIEF DESCRIPTION OF THE DRAWINGS

FIGS. 1-7 illustrate, as a first embodiment of this invention, an intake port structure for an internal combustion engine, in which FIG. 1 is a schematic vertical cross-sectional view of the structure, FIG. 2 is a schematic cross-sectional view taken along a plane perpendicular to the flowing direction of its intake air (i.e., a cross-sectional view taken in the direction of arrows A—A of FIG. 1), FIG. 3 is a schematic cross-sectional view of a conventional intake port structure (a drawing corresponding to the cross-sectional view taken in the direction of arrows A—A of FIG. 1) and is added for the sake of comparison with the cross-sectional shape of the intake port structure of the first embodiment, FIG. 4 is a diagram showing the cross-sectional shape of the intake port structure of the first embodiment as plotted on a coordinate system, FIG. 5 is a diagram of a right-hand half of the cross-sectional shape when the intake port structure of the first embodiment for the internal combustion engine is plotted on a coordinate system, and FIGS. 6 and 7 are diagrams illustrating advantages of the intake port structure of the first embodiment, respectively;

FIGS. 8-10 depict, as a second embodiment of this invention, another intake port structure for an internal combustion engine, in which FIG. 8 is its schematic vertical cross-sectional view, FIG. 9 is its schematic cross-section taken along a plane perpendicular to the flowing direction of its intake air (i.e., a cross-sectional view taken in the direction of arrows B—B of FIG. 8), and FIG. 10 is a diagram showing its advantage;

FIGS. 16-22 show, as a third embodiment of this invention, a further intake port structure for an internal combustion engine, in which FIG. 16 is its schematic plan view, FIG. 17 is its schematic fragmentary vertical cross-sectional view, FIG. 18 is its schematic cross-sectional view taken along a plane perpendicular to the flowing direction of intake air through the intake port structure, FIGS. 19-21 are schematic cross-sectional views illustrating, in correspondence to FIG. 18, various examples of cross-sectional shapes taken along planes perpendicular to the flowing directions of their respective intake air; and FIG. 22 is a schematic plan view showing its modification in correspondence to FIG. 16;

FIGS. 23-28 illustrate, as a fourth embodiment of this invention, a still further intake port structure for an internal combustion engine, in which FIG. 23 is its schematic plan view, FIG. 24 is its schematic cross-sectional view taken along a plane perpendicular to the flowing direction of its intake air, FIGS. 25-27 are schematic cross-sectional views showing, in correspondence to FIG. 24, various examples of cross-sectional shapes taken along planes perpendicular to their respective flowing directions, and FIG. 28 is a schematic plan view showing a still further modification in correspondence to FIG. 23;

FIGS. 29-33 depict conventional intake port structures for internal combustion engines, in which FIG. 29 is a schematic vertical cross-sectional view of one of the conventional intake port structure and certain elements disposed around its associated combustion chamber, FIG. 30 is its schematic perspective view also depicting the elements arranged around its associated combustion chamber, FIG. 31 is its schematic cross-sectional view taken along a plane perpendicular to the flowing direction of its intake air (i.e., the cross-section taken in the direction of arrows C—C of FIG. 29), FIG. 32 is a cross-sectional view showing another conventional example of its schematic cross-sectional view taken along a plane perpendicular to the flowing direction of its intake air (i.e., a drawing corresponding to the cross-section taken in the direction of arrows C—C of FIG. 29), and FIG. 33 is a schematic vertical cross-sectional view showing the other conventional example.

BEST MODES FOR CARRYING OUT THE INVENTION

With reference to the drawings, the embodiments of the present invention will hereinafter be described.

Figure 29:
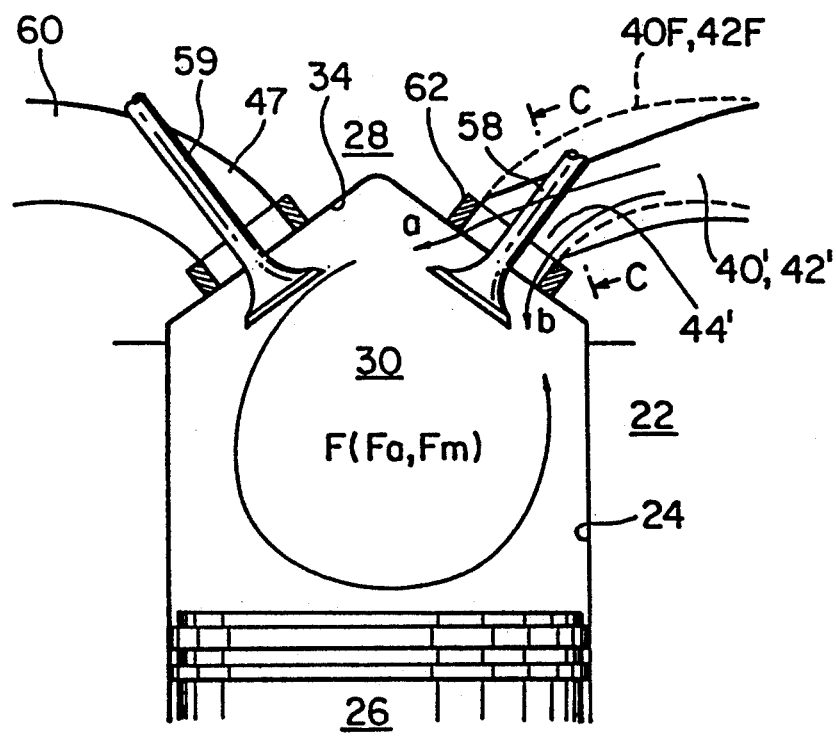
Figure 30:
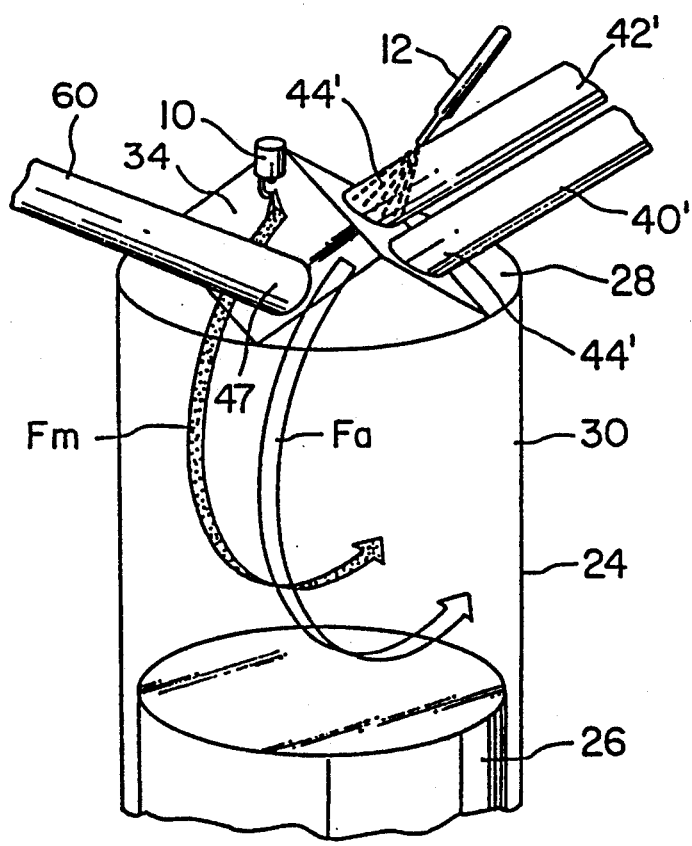
Figure 31:
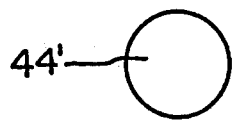
Figure 32:
Figure 33:
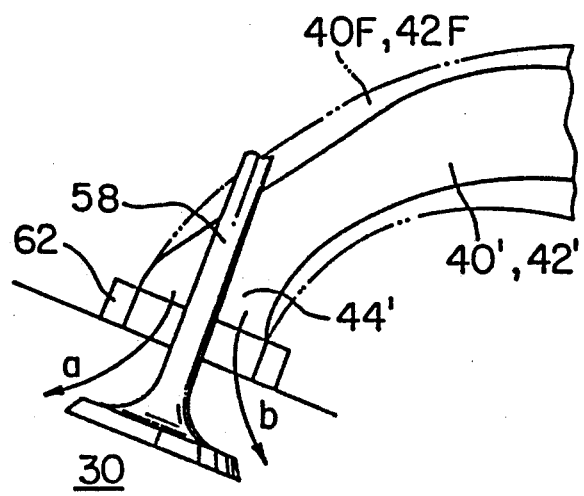
Figure 34:
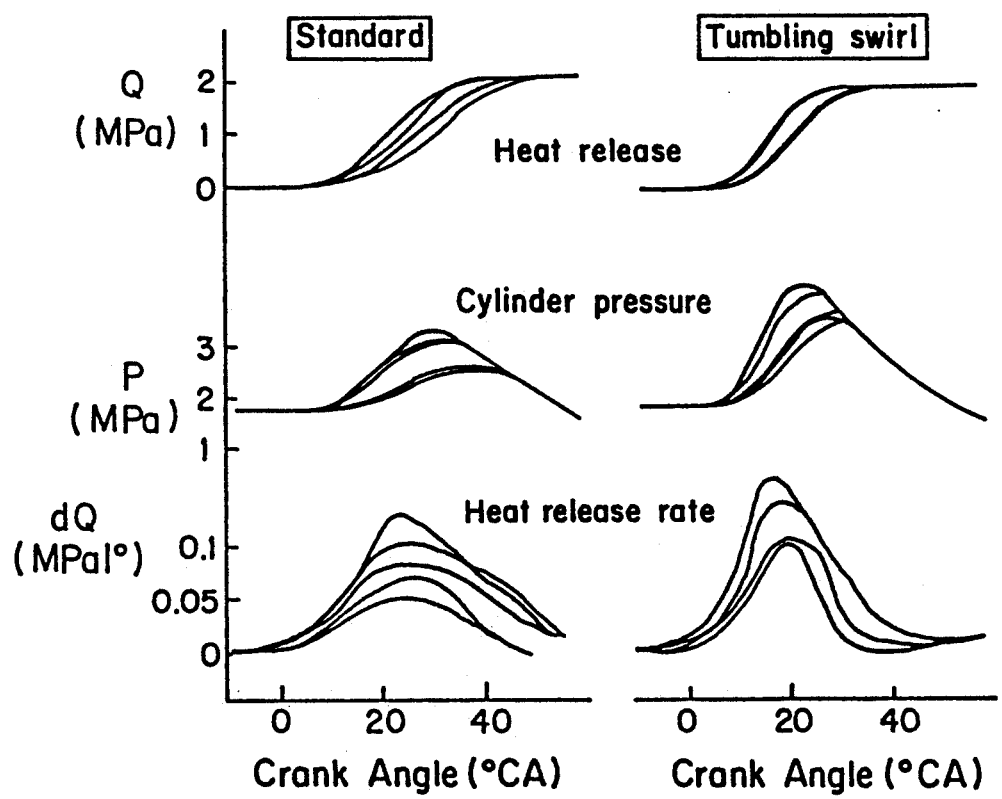
FIG. 34 diagrammatically illustrates advantages available from a tumble flow.

Describing the first embodiment first of all, the overall structure of each cylinder of an internal combustion engine, said cylinder being equipped with intake ports 44 of this invention, is constructed, for example, substantially as in the conventional example shown in FIGS. 29 and 30. For elements of structure not shown in FIG. 1, reference may be made to FIGS. 29 and 30. The spark plug 10 is arranged in the vicinity of the intake port 44 on the side of the injector 12.

Namely, each cylinder of the internal combustion, said cylinder being associated with the intake port 44, has the combustion chamber 30 which is formed by the cylinder bore 24, the piston 26 and the cylinder head 28. The cylinder bore is formed in the cylinder block 22. The intake ports 44 of respective intake passage 40,42 communicate to the combustion chamber 30 and are provided with intake valves 58, respectively.

The pentroof 34 is formed in the upper wall of the combustion chamber 30. The pentroof 34 is provided with an inclined wall so that intake air flows from the respective intake passages 40,42 can be guided downwardly along the inner wall of the cylinder bore 24, said inner wall extending on and along extensions of axes of the respective intake passages 40,42. Owing to the guidance by the pentroof 34, the occurrence of a tumble flow as shown by arrow F is also promoted.

Figure 1:
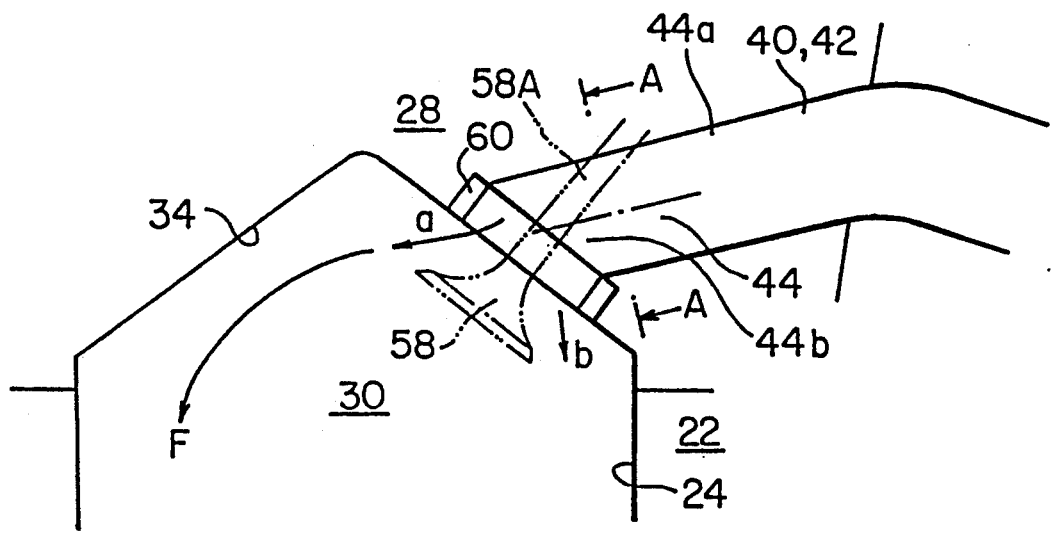
Figure 2:
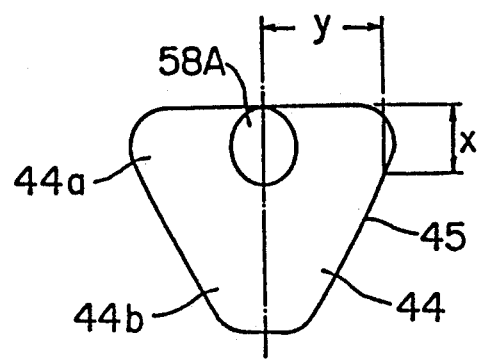

Each intake port 4 of the internal combustion engine is formed as a linear, i.e., straight port as shown in FIG. 1. In the cross-sectional shape of the straight port, the tumble-flow-side half 44a of the intake port 44 (namely, the upper half of the intake port 44, through which upper half a principal fraction flow acting to develop the tumble flow advances) is formed broader than the other half 44b (namely, the lower half of the intake port 44, through which lower half such a fraction flow as acting to suppress the tumble flow advances) as shown in FIG. 2 so that the intake air flow through the intake port 4 is off-centered toward the side of the tumble flow (namely, toward the upper half 44a of the intake port 44).

As a result, the intake air flow from the intake port 44 can easily develop the tumble flow F in the combustion chamber 30.

In this first embodiment, the intake port 44 is formed to have a substantially inverted triangular cross-section. Incidentally, designated at symbol 58A in FIG. 2 is the valve stem.

Figure 4:
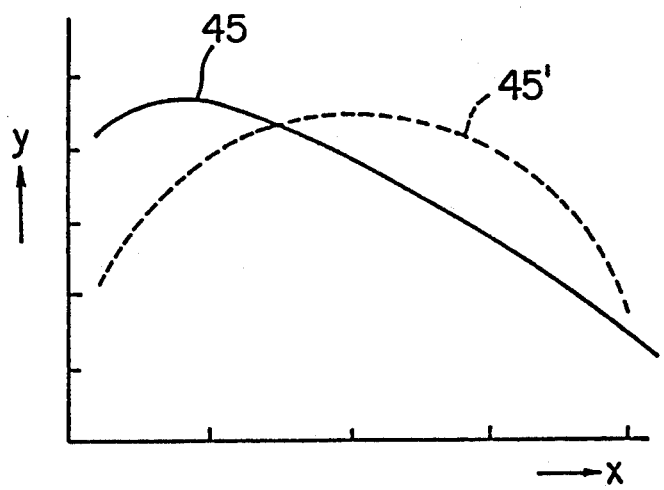

A side contour of a cross-section 45 of the intake port 44 having such a substantially inverted triangular shape can be plotted on a coordinate system, for example, as illustrated in FIG. 4. In FIG. 4, x indicates the distance from the upper end of the cross-section 45 of the intake port while y shows the distance (width) of the cross-section 45 of the intake port from a vertical center line.

Figure 3:
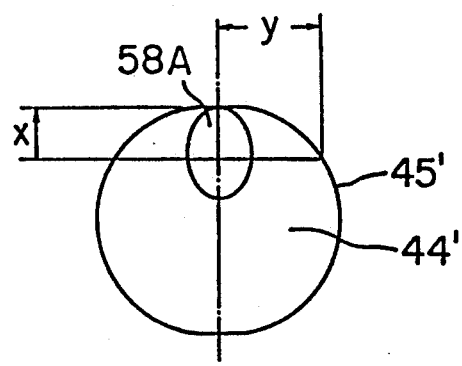

Incidentally, the broken line in FIG. 4 illustrates a side contour of a cross-section 45' of such a conventional intake port 44' of an oval cross-section as depicted in FIG. 3. It is envisaged that the cross-section 45 of the intake port 44 is formed broader at the tumble-flow-side half 44a on an upper side (i.e., on a left side as viewed in FIG. 4) and the flow therethrough is off-centered toward the tumble-flow-side half 44a.

Figure 5:
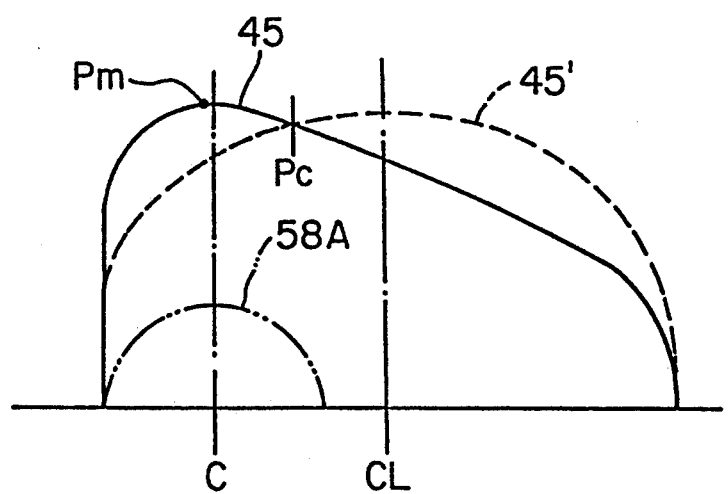

In FIG. 5, both end portions of the curve of FIG. 4 are smoothly extended to complete the shape of the entire cross-section of the intake port 44. The cross-section is shown together with the cross-section 45' of a conventional intake port 44' whose cross-section is circular.

The intake port 44 shown in FIGS. 4 and 5 is, in the cross-section thereof, formed in a curved shape with corner portions chamfered off. Its broadest part (the part where y takes the largest value) Pm is disposed at a position biased further toward the side of the tumble flow (i.e., the side where x is 0) beyond a cross-sectional center (see letter C) of the valve stem 58A at a position where the valve stem is internally in contact with the intake port 44.

Further, the width of the intake port 44 is determined in such a way that it becomes gradually smaller from the broadest part Pm toward an end portion of the other half (i.e., the end portion of the side where x becomes greater). A crossing point Pc between the cross-sectional shape 45' of the intake port 44, which has a flow passage cross-sectional area equal to the intake port 44 and also a conventional circular, elliptical or oval, cross-sectional shape, and the cross-sectional shape 45 of the intake port 4 is located on the side of the tumble flow (i.e., the side where x is 0) beyond the center of the port (i.e., the center in the direction x).

Since the intake port structure as the first embodiment of the present invention is constructed as described above, the intake air flow fraction from the tumble-flow-side half 44a of the intake port 44 is substantially stronger than the intake air flow fraction from the other half 44b of the intake port 44.

The intake air flow fraction from the tumble-flow-side half 44a of the intake port 44 is a flow fraction which acts to develop the tumble flow, whereas the intake air flow fraction from the other half 44b of the intake port 44 is a fraction which acts to suppress the tumble flow. Because of the above-described imbalance in flow rate, the strength of the tumble flow can be increased without reducing the overall cross-section of the flow pass of the intake port, in other words, while maintaining the flow rate (flow velocity) of the intake air flow through the whole intake port 44.

It is to be noted particularly that the broadest part Pm of the intake port 44 is disposed on the side of the tumble flow (i.e., the side where x is 0) beyond the cross-sectional center (see letter C) of the valve stem 58A at the position where the valve stem is internally in contact with the intake port 44 and the crossing point Pc with the cross-section of the intake port having the conventional circular elliptical or oval cross-section is located on the side of the tumble flow (i.e., the side where x is 0) beyond the center of the port (i.e., the center in the direction x). Even when the intake air flow on the side of the tumble flow is prevented by the valve stem 58A, a sufficient intake air flow therefore occurs on the side of the tumble flow so that the advantage described above can be obtained easily and surely.

Figure 6:
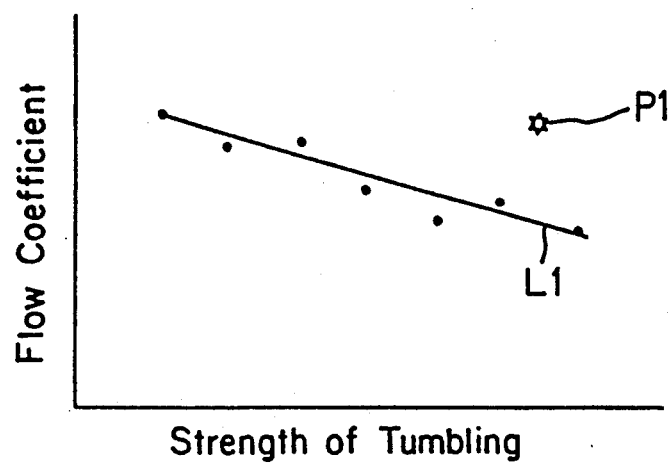

Such an advantage can also be envisaged, for example, from an observation of FIG. 6 which shows flow coefficient as a function of the strength of tumbling. In FIG. 6, the dots present measurement values of an intake port which is a conventional straight port having a circular, elliptical, oval or substantially square cross-sectional shape. Line L1 indicates characteristics obtained from these measurement values. It is understood that there is a contradictory relationship (i.e., a trade-off relationship), namely, that the maximum flow rate (flow coefficient) drops as the strength of the tumble flow (the strength of tumbling) is increased. In contrast, point P1 shows data of the present intake port 44. It is understood that the maximum flow rate (flow coefficient) does not drop even when the strength of the tumble flow (the strength of tumbling) is increased.

Figure 7:
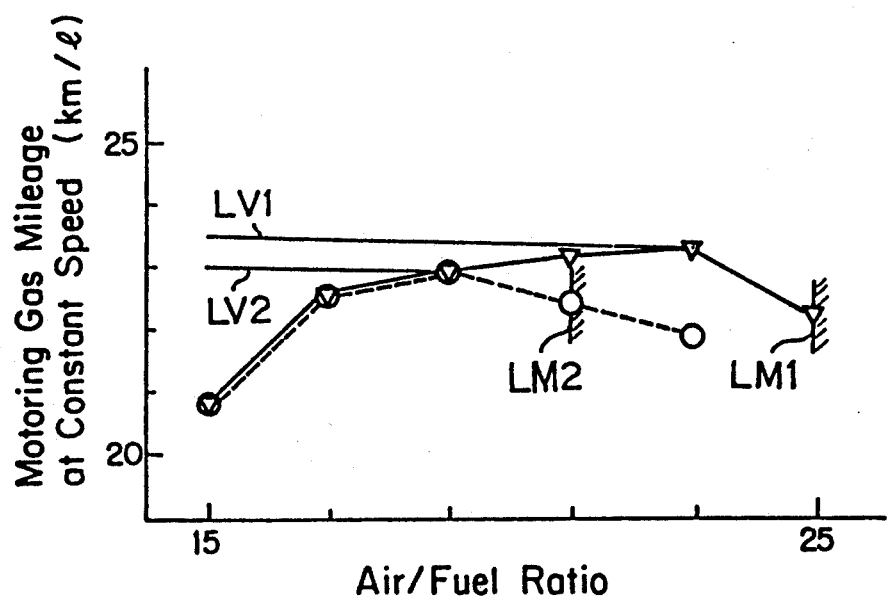

Regarding the data of constant-speed motoring fuel mileages at varied air/fuel ratios, FIG. 7 illustrates data (indicated by triangles) of the present intake port 44 in comparison with data (indicated by circles) of a conventional intake port having a usual circular, elliptical or oval cross-sectional shape. It is envisaged that the best gas mileage is improved from LV2 to LV1 and the driving limit at the maximum air-fuel ratio is improved from LM2 to LM1.

Figure 8:
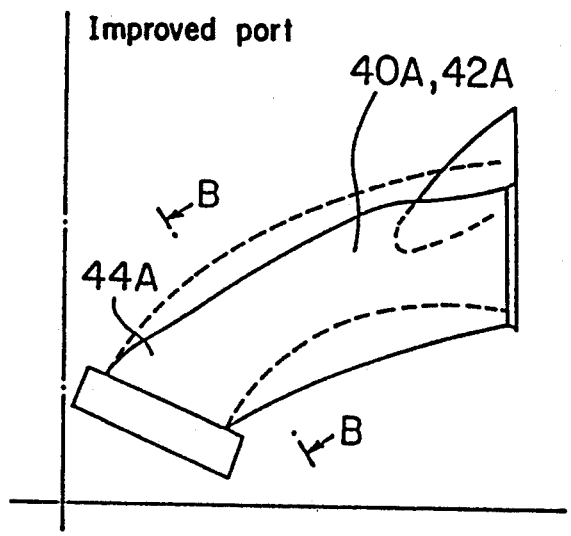

A description will next be made of the second embodiment. The overall structure of each cylinder of an internal combustion engine equipped with intake ports 44A is substantially as in the first embodiment described above so that its description is omitted herein. As is illustrated in FIG. 8, each intake port 44A is a straight port, but its upper part (i.e., on the side of the tumble flow) is not made extremely straight and is formed with a slight bulge.

Figure 9:
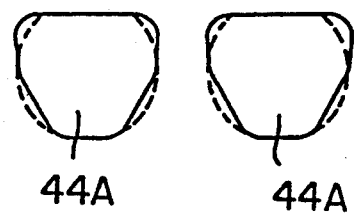

Although the cross-section of the intake port 44A is substantially triangular as depicted in FIG. 9, significant chamfering is applied so that the cross-section is more circular than that of the intake port of the first embodiment.

Figure 10:
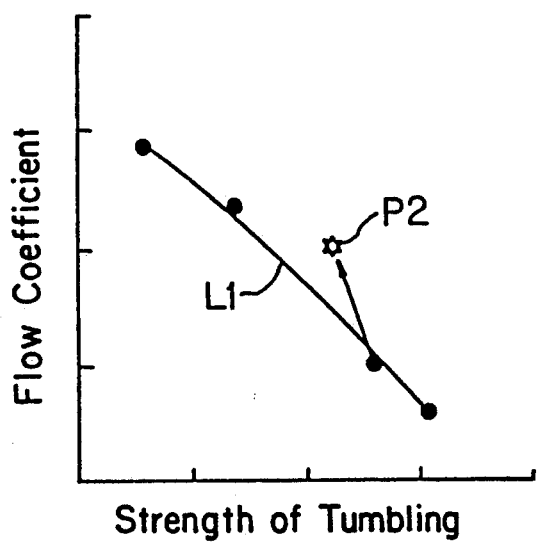

Since the intake port structure as the second embodiment of this invention is constructed as described above, it can bring about substantially the same advantages as the first embodiment described above. With regard to flow coefficient as a function of the strength of tumbling, for example, it is understood that the strength of tumbling and the flow coefficient can be set at higher levels compared with the corresponding characteristics (see line L1) of a conventional intake port which is a straight port having a circular, elliptical, oval or substantially square, cross-sectional shape as depicted in FIG. 10.

Figure 11:
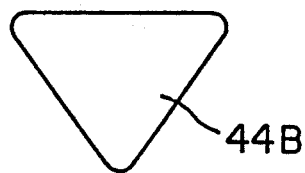
FIGS. 11-15 are, all, cross-sectional views showing modifications of the intake port structures of this invention for internal combustion engines (drawings corresponding to the cross-sectional view taken in the direction of arrows A—A of FIG. 1)
Figure 12:
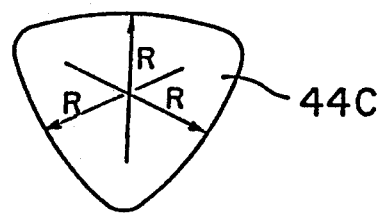
Figure 13:
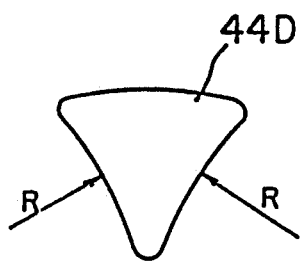
Figure 14:
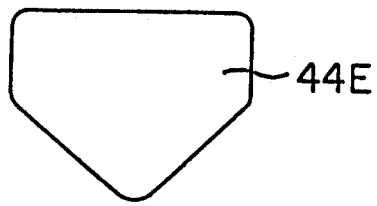
Figure 15:
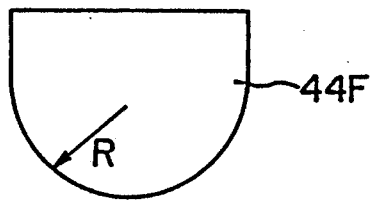

As the cross-sectional shape of the intake port 44, those shown in FIGS. 11-15 can also be contemplated. The cross-section of an intake port 44B shown in FIG. 11 is formed in a triangular shape chamfered only a little. The cross-section of another intake port 44C illustrated in FIG. 12 is formed in a convex triangular shape in which each side is formed of a curve whose radius is R and in which each corner is chamfered only a little. The cross-section of a further intake port 44D depicted in FIG. 13 is formed in a concave triangular shape in which the two sides, i.e., right-hand and left-hand sides (relative to the direction of the width) are each formed of a curve having a radius R and in which each corner is chamfered only a little. The cross-section of a still further intake port 44E illustrated in FIG. 14 is formed in such a shape that upper parts of two sides, i.e., right-hand and left-hand sides (relative to the direction of the width) extend in parallel with each other and lower parts of the two sides extend with the width therebetween gradually decreasing in the downwardly direction, that is, in the shape of a baseball home plate. The cross-section of a still further intake port 44F depicted in FIG. 15 is formed in a tongue shape with the other half 44b being rounded.

The intake ports 44B, 44C, 44D, 44E and 44F of these various cross-sectional shapes can also bring about substantially the same advantages as described above.

Incidentally, substantially the same advantages as described above can also be obtained when the cross-section of the intake port 44 is defined such that, relative to the center line CL (see FIG. 5) as a boundary, the percentage of the arc S2 lower than the boundary (the right-hand part of the center line CL in FIG. 5) based the area S1 higher than the boundary (the left-hand part of the center line CL in FIG. 5) does not exceed a prescribed value (for example, 95 percent), for example, is defined to satisfy $S2 \leq S1 \times 0.95$.

The third embodiment will be described next with reference to FIGS. 16-22.

Figure 16:
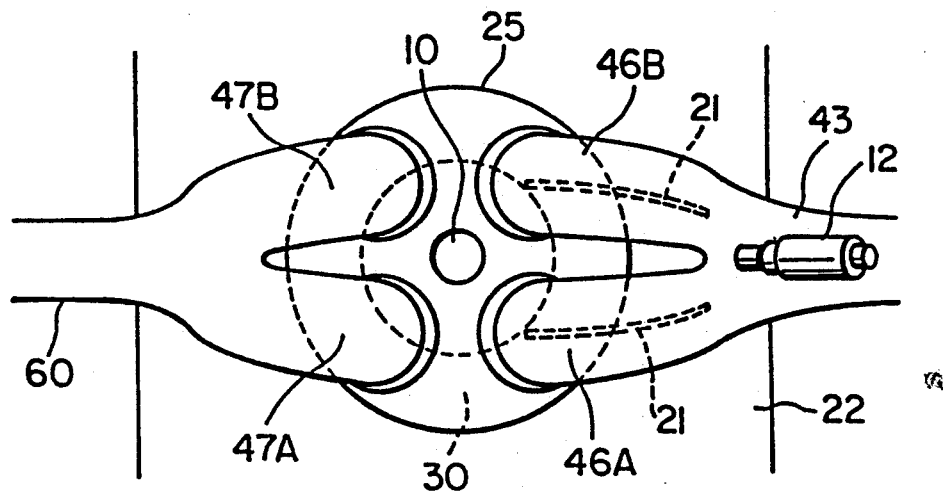
Figure 17:
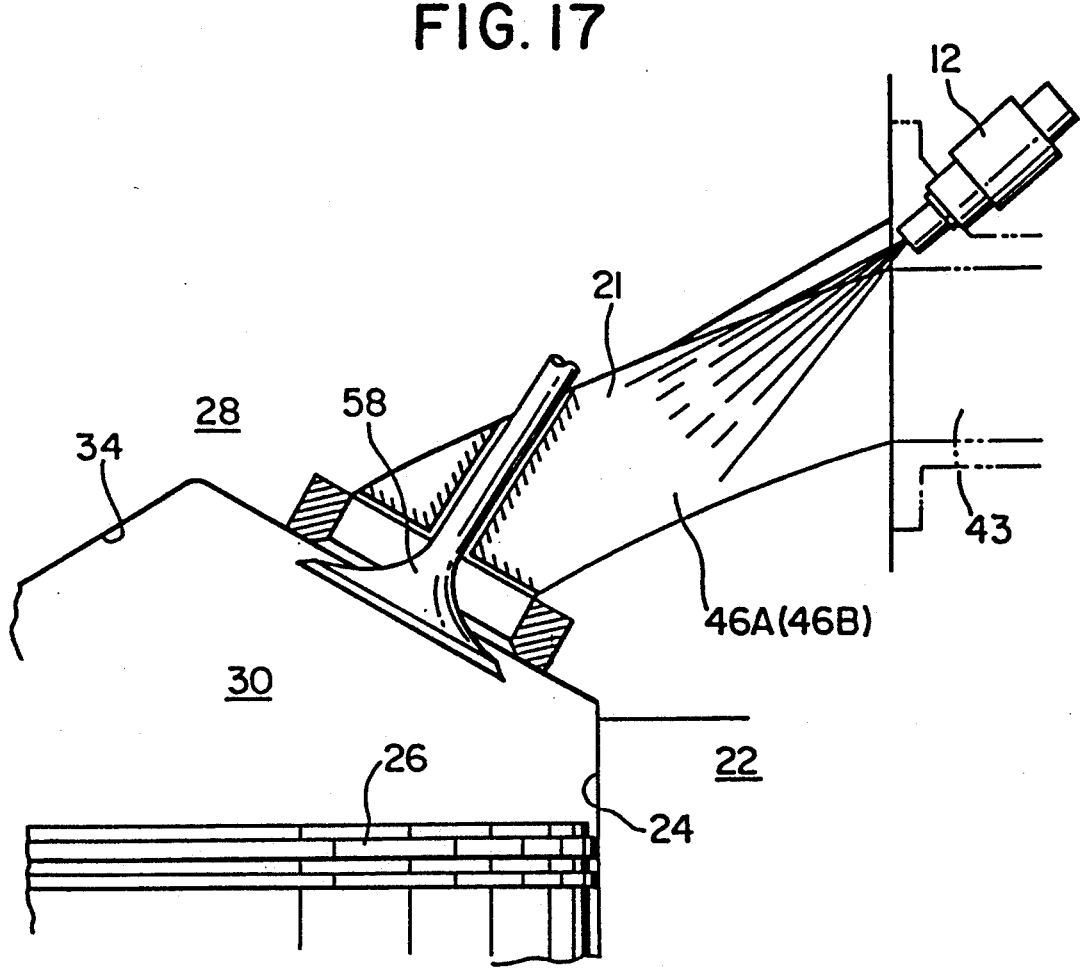

In the third embodiment, as is illustrated in FIGS. 16 and 17, each cylinder of an internal combustion engine, said cylinder having the intake port structure of the embodiment, has the combustion chamber 30 which is formed by the cylinder bore 24, the piston 26 and the cylinder head 28. The cylinder bore is formed in the cylinder block 22. Two intake ports 46A,46B communicate to the combustion chamber 30 and are provided with the intake valves 58, respectively. Two exhaust ports 47A,47B also communicate to the combustion chamber 30 and are provided with exhaust valves, respectively.

The respective intake ports 46A,46B merge together on an upstream side and are communicated and connected commonly to the intake passage 43. On the other hand, the exhaust ports 47A,47B merge together on a downstream side and are communicated and connected commonly to the exhaust passage 60.

At a central part of the cylinder 25, the spark plug 10 as an ignition means is disposed so that the spark plug is positioned between the intake ports 46A and 46B.

The pentroof 34 is also formed in the upper wall portion of the combustion chamber 30. This pentroof 34 is provided with an inclined surface so that intake air flows from the respective intake ports 46A,46B can be guided downwardly along the inner wall of the cylinder bore 24, said inner wall lying on extensions of the axes of the individual intake ports 46A,46B. Owing to the guidance by the pentroof 34, occurrence of a tumble flow is also promoted.

Figure 18:
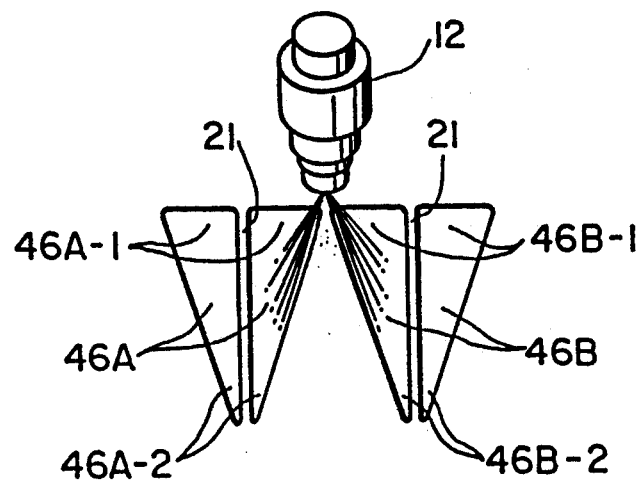

The intake ports 46A,46B of the internal combustion engine are both formed as linear, i.e., straight ports as shown in FIG. 17. In the cross-sections of the straight ports, tumble-flow-side halves 46A-1,46B-1 of the intake ports 46A,46B (namely, the upper halves of the intake ports 46A,46B, through which upper halves principal fraction flows acting to develop the tumble flow advance) are formed broader than the other halves 46A-2,46B-2 (namely, the lower halves of the intake ports 46A,46B, through which lower halves such fraction flows as acting to suppress the tumble flow advance) as shown in FIG. 18 so that the intake air flows through the intake ports 46A,46B are off-centered toward the side of the tumble flow (namely, toward the upper halves 46A-1,46B-1 of the intake ports 46A,46B). As a consequence, the intake air flows from the intake ports 46A,46B can easily develop the tumble flow in the combustion chamber 30.

In the third embodiment, the intake ports 46A,46B are each formed to have a substantially inverted triangular cross-section.

Incidentally, the intake ports 46A,46B are internally provided with partitions 21, respectively, so that each of the intake ports 46A,46B is axially divided into two halves. By each partition 21, the interior of the intake port 46A or 46B is divided into two halves along the flowing direction of an air-fuel mixture, one being on a side of the spark plug (a center side half) and the other on a side opposite to the spark plug (on an outer side half).

In the proximity of the junction of the intake ports 46A,46B, the injector 12 is disposed as fuel feeding means. This injector 12 feeds fuel to the center side halves of the intake ports 46A,46B, which halves are defined by the partitions 21, respectively (see FIGS. 16 and 18).

The valve stem of each intake valve 58 axially extends through the associated partition 21.

Figure 19:
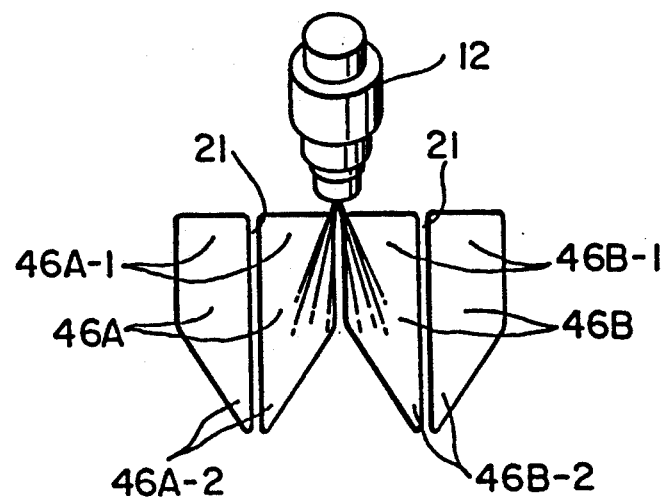
Figure 20:
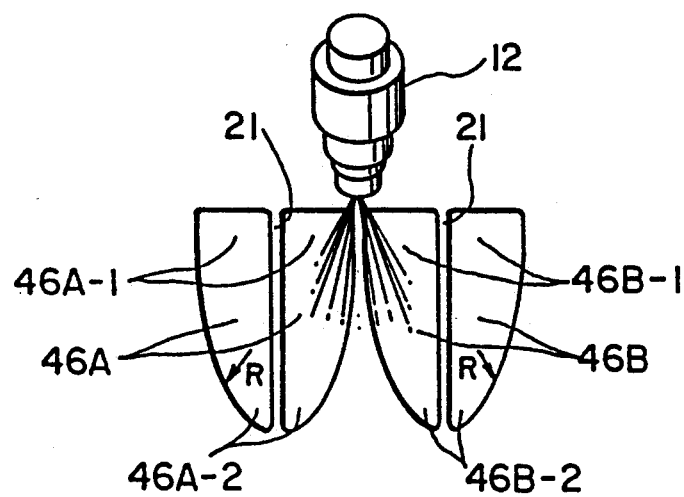
Figure 21:
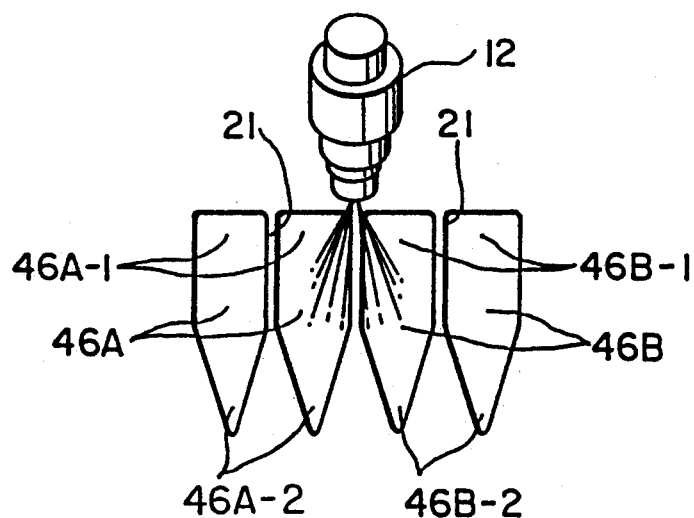

As the cross-sectional shapes of the intake ports 46A,46B provided with the partitions 21 that make the tumble-flow-side halves 46A-1,46B-1 broader than the other halves 46A-2,46B-2, various cross-sectional shapes can be contemplated in addition to that illustrated in FIG. 18, including a cross-sectional shape formed like a baseball home plate as depicted in FIG. 19, a cross-sectional shape rounded at the other halves 46A-2,46B-2 to present a tongue-like shape as illustrated in FIG. 20, and a cross-sectional shape in which the individual intake port parts divided by the partitions 21 is in the form of a baseball home plate as shown in FIG. 21.

Owing to the construction as described above, intake air is mixed with fuel injected through the injector 12 and flows into the combustion chamber 30 through the respective intake ports 46A,46B. After the air-fuel mixture is compressed and is then caused to expand (explode) within the combustion chamber 30, the resultant exhaust is discharged into the exhaust passage 60 through the respective exhaust ports 47A,47B. Upon intake, the outer side halves of the intake ports 46A,46B, said outer side halves being defined by the corresponding partitions 21, are fed only with air, and the fuel is fed only to the center side halves of the intake ports 46A,46B, said center side halves being also defined by the corresponding partitions 21. The fuel and air are therefore stratified so that the air-fuel mixture in a fuel-rich layer is fed to the spark plug 10. Accordingly, a lean air-fuel mixture is fed to the entire combustion chamber 30 and the spark plug 10 is fed with the fuel in an amount sufficient to cause ignition. It is therefore possible to provide a fuel-rich region near the spark plug 10. This allows to operate the engine on an air-fuel mixture leaner than the stoichiometric air-fuel ratio without impairing the ignition.

Further, the intake air flow fractions from the tumble-flow-side halves 46A-1,46B-1 of the respective intake ports 46A,46B become substantially stronger than the intake air flow fractions from the other halves 46A-2,46B-2.

Namely, the intake air flow fractions from the tumble-flow-side halves 46A-1,46B-1 of the intake ports 46A,46B are flow fractions that develop the tumble flow, whereas the intake air flow fractions from the other halves 46A-2,46B-2 of the intake ports 46A,46B are fractions that suppress the tumble flow. Owing to the above-described imbalance in flow rate, the tumble flow can be increased in strength without reducing the cross-sectional area of the overall flow passage of the intake port, in other words, while maintaining the flow rate (flow velocity) of the intake air flow through the whole intake port.

Figure 22:
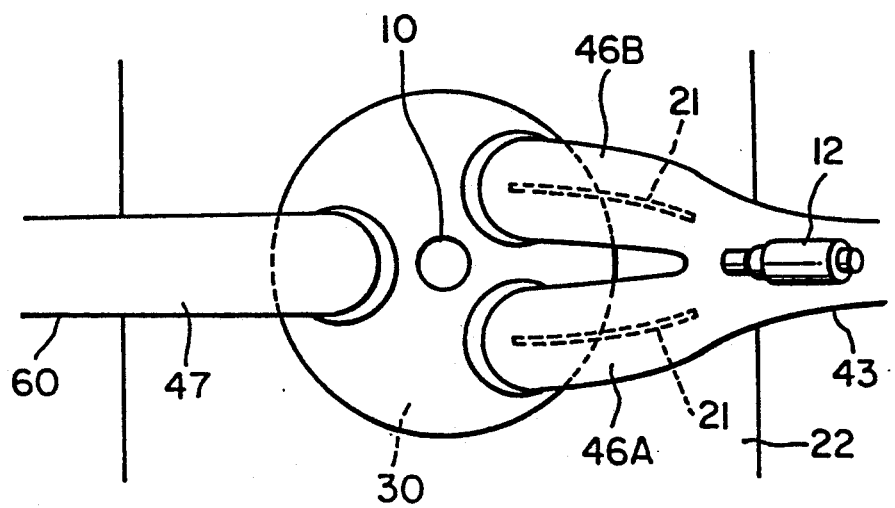
Figure 23:
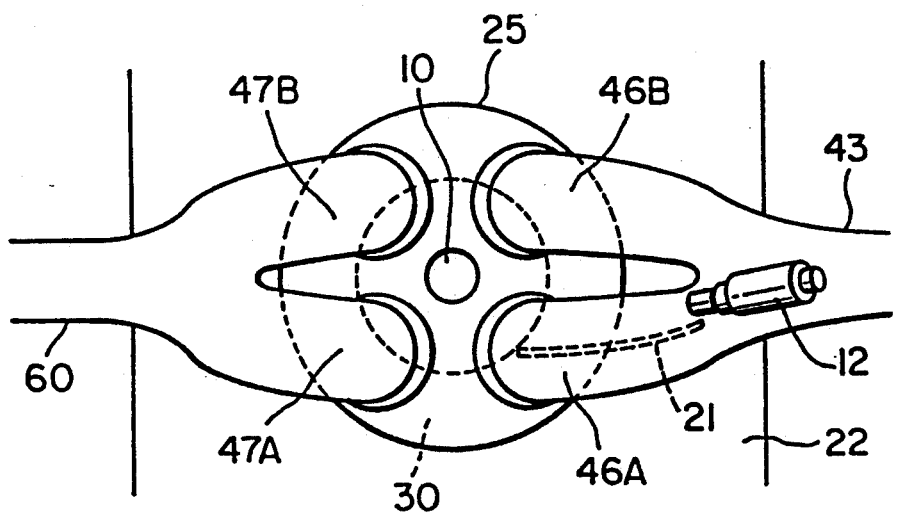

This third embodiment can also be applied likewise to a 3-valve internal combustion engine equipped with two intake ports 46A,46B and one exhaust port 47 as depicted in FIG. 22.

The fourth embodiment will be described next with reference to FIGS. 23-28.

In an internal combustion engine having the intake port structure according to the fourth embodiment, the partition 21 is not attached to each of the intake ports 46A,46B unlike the third embodiment described above but, as is illustrated in FIGS. 23 and 24, only one of the intake ports, i.e., only the intake port 46A is divided into two halves, one being on a center side and the other on an outer side, by the partition 21 and the injector 12 is attached to the intake port 46A alone. The remaining structure is similar to that described above in connection with the third embodiment.

Namely, the two intake ports 46A,46B are arranged in communication with the combustion chamber 30 and are provided with the intake valves 58, respectively. The two exhaust ports 47A,47B are also arranged in communication with the combustion chamber 30 and are provided with exhaust valves, respectively. Further, the respective intake ports 46A,46B merge together on an upstream side and are communicated and connected commonly to the intake passage 43. The respective exhaust ports 47A,47B merge together on a downstream side and are communicated and connected commonly to the exhaust passage 60.

At a central part of the cylinder 25, the spark plug 10 as an ignition means is disposed so that the spark plug is positioned between the intake ports 46A and 46B. The pentroof 34 is formed in the upper wall portion of the combustion chamber 30. This pentroof 34 is provided with an inclined surface so that intake air flows from the respective intake ports 46A,46B can be guided downwardly along the inner wall of the cylinder bore 24, said inner wall lying on extensions of the axes of the individual intake ports 46A,46B.

Figure 24:
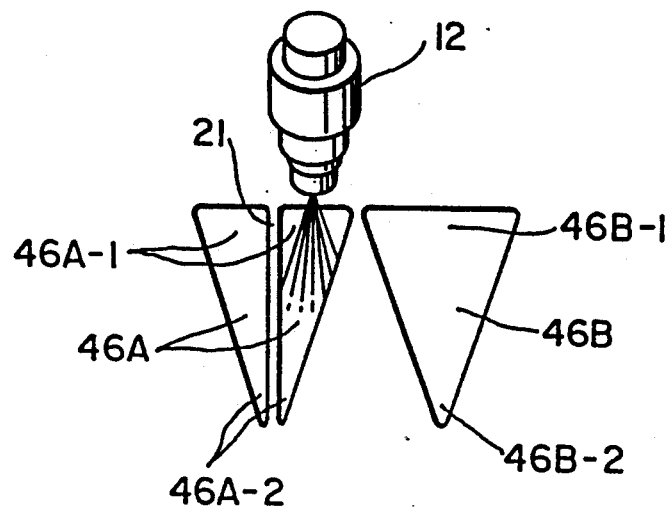

The intake ports 46A,46B of the internal combustion engine are both formed as linear, i.e., straight ports as shown. In the cross-sections of the straight ports, the tumble-flow-side halves 46A-1,46B-1 of the intake ports 46A,46B (namely, the upper halves of the intake ports 46A,46B, through which upper halves principal fraction flows acting to develop the tumble flow advance) are formed broader than the other halves 46A-2, 46B-2 (namely, the lower halves of the intake ports 46A,46B, through which lower halves such fraction flows as acting to suppress the tumble flow advance) as shown in FIG. 24 so that the intake air flows through the intake ports 46A,46B are off-centered toward the side of the tumble flow (namely, toward the upper halves 46A-1,46B-1 of the intake ports 46A,46B). As a consequence, the intake air flows from the intake ports 46A,46B can easily develop the tumble flow in the combustion chamber 30. In this embodiment, the intake ports 46A,46B are also formed to have a substantially inverted triangular cross-section.

The partition 21 is arranged inside one of the intake ports, i.e., in the intake port 46A so that the interior of the intake port 46A is axially divided into two halves. By the partition 21, the interior of the intake port 46A is divided into the two halves along the flowing direction of the air-fuel mixture, one being on a side of the spark plug (a center side half) and the other on a side opposite to the spark plug (on an outer side half). Further, said one intake port 46A is provided with the injector 12 as a fuel feeding means. The injector 12 serves to feed fuel to the center side half of the intake port 46A, which center side half is defined by the partition 21 (see FIGS. 23 and 24).

Figure 25:
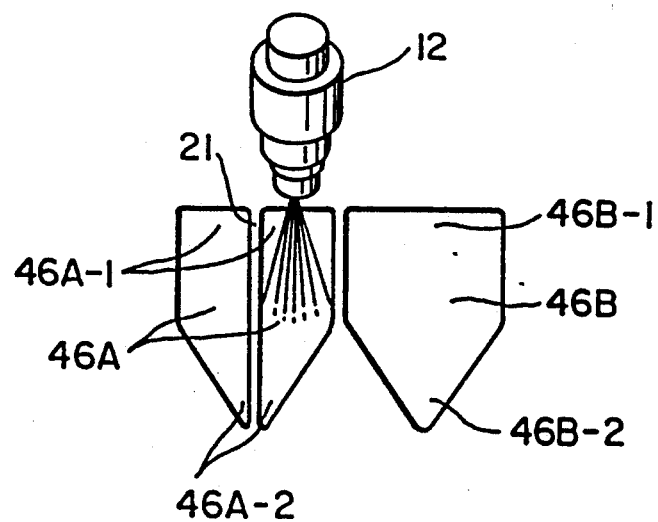
Figure 26:
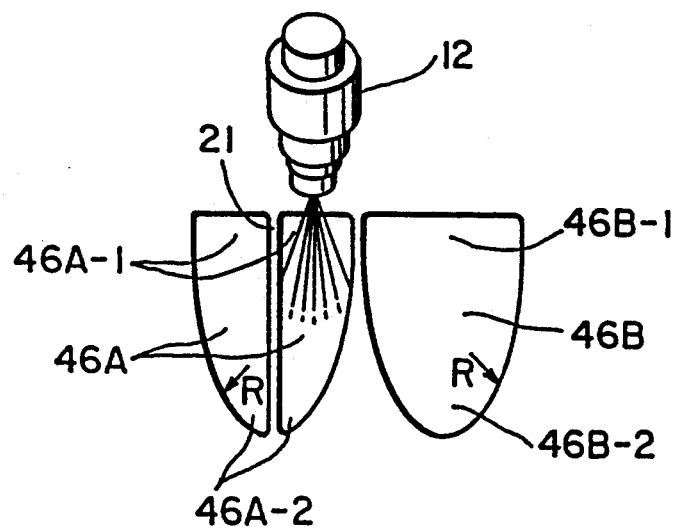
Figure 27:
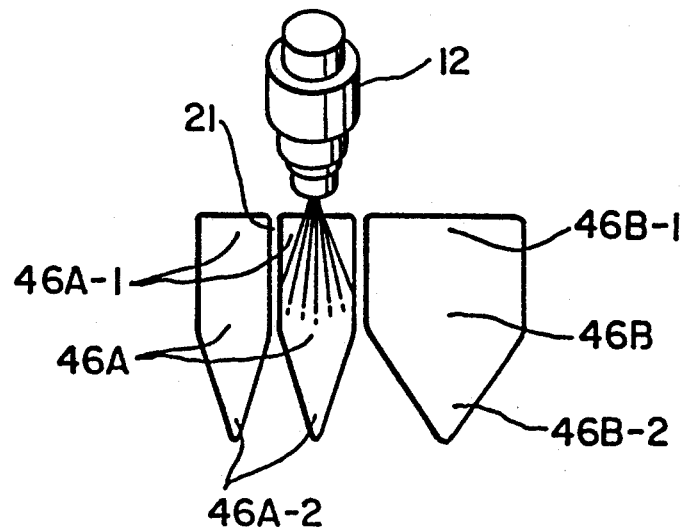

As the cross-sectional shapes of the intake port 46A provided with the partition 21 and of the intake port 46B not provided with the partition 21 that make the tumble-flow-side halves 46A-1,46B-1 broader than the other halves 46A-2,46B-2 as in the above-described third embodiment, various cross-sectional shapes can be contemplated in addition to that illustrated in FIG. 24, including a cross-sectional shape formed like a baseball home plate as depicted in FIG. 25, a cross-sectional shape rounded at the other halves 46A-2,46B-2 to present a tongue-like shape as illustrated in FIG. 26, and a cross-sectional shape in which, as shown in FIG. 27, the individual parts of the intake port 47A divided by the partition 21 are each in the form of a baseball home plate and the intake port 46B not provided with the partition 21 is in the form of a baseball home plate.

Owing to the construction as described above, upon intake, only air is fed to the outer side half of the intake port 46A, said outer side half being defined by the partition 21, and to the intake port 46B and the fuel is fed only to the center side half of the intake port 46A, said center side half being defined by the partition 21. Like the third embodiment described above, the fuel and air are stratified so that the air-fuel mixture in a fuel-rich layer is fed to the spark plug 10. Accordingly, a lean air-fuel mixture is fed to the entire combustion chamber 30 and the spark plug 10 is fed with the fuel in a amount sufficient to cause ignition It is therefore possible to provide a fuel-rich region near the spark plug 10. This allows to operate the engine on an air-fuel mixture leaner than the stoichiometric air-fuel ratio without impairing the ignition. Further, the intake air flow fractions from the tumble-flow-side halves 46A-1, 46B-1 of the respective intake ports 46A,46B become substantially stronger than the intake air flow fractions from the other halves 46A-2,46B-2. Namely, the intake air flow fractions from the tumble-flow-side halves 46A-1, 46B-1 of the intake ports 46A,46B are flow fractions that develop the tumble flow, whereas the intake air flow fractions from the other halves 46A-2,46B-2 of the intake ports 46A,46B are fractions that suppress the tumble flow. Owing to the above-described imbalance in flow rate, the tumble flow can be increased in strength without reducing the cross-sectional area of the overall flow passage of the intake port, in other words, while maintaining the flow rate (flow velocity) of the intake air flow through the whole intake port.

Figure 28:
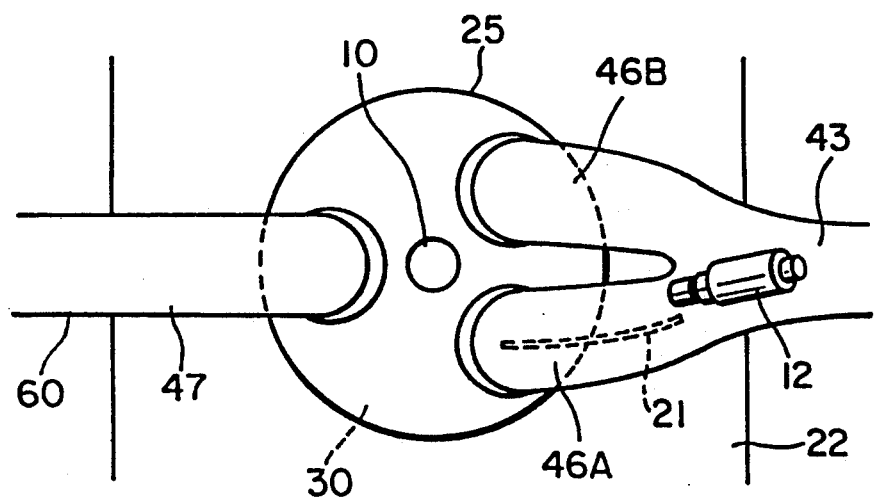

This fourth embodiment can also be applied likewise to a 3-valve internal combustion engine equipped with two intake ports 46A,46B and one exhaust port 47 as depicted in FIG. 28.

Industrial Applicability

According to the intake port structure according to the present invention, which structure is suitable for use in an internal combustion engine, the strength of a tumble flow can be increased without reducing the maximum flow rate (flow coefficient) and, in addition, the internal combustion engine can be operated on an air-fuel mixture leaner than the stoichiometric air-fuel ratio without impairing the ignition. Accordingly, the intake port structure is suited for use as an intake port structure in an internal combustion engine especially to be mounted on an automotive vehicle.

We claim:

1. An intake port structure for an internal combustion engine constructed to cause an intake air flow from an intake port (44) to become a tumble flow in a combustion chamber (30), characterized in that:
the intake port (44) is broader in a tumble-flow-side half (44a) thereof than in the other half (44b) and an intake air flow through the intake port (44) is off-centered toward a side of the tumble flow, whereby the intake air flow from the intake port (44) can promote the tumble flow.

2. The intake port structure of claim 1, wherein the intake port (44) is formed broader in the tumble-flow-side half (44a) than in the other half (44b) to have a substantially triangular cross-section.

3. The intake port structure of claim 1, wherein the intake port (44) is formed broader in the tumble-flow-side half (44a) than in the other half (44b) to have a cross-section in the form of a baseball home plate.

4. The intake port structure of claim 1, wherein the intake port (44) is formed broader in the tumble-flow-side half (44a) than in the other half (44b) to have a tongue-shaped cross-section.

5. The intake port structure of claim 1, wherein the intake port (44) is formed broader in the tumble-flow-side half (44a) than in the other half (44b) so that a broadest part of the intake port is disposed at a position biased outwardly of a cross-sectional center of a valve stem (58A) at a position where the valve stem is internally in contact with the intake port (44) and the intake port becomes gradually narrower from the broadest part toward an end portion thereof on a side of the other half (44b).

6. An intake port structure for an internal combustion engine constructed to cause intake air flows from corresponding plural intake ports (46A,46B) to become a tumble flow in a combustion chamber (30), characterized in that:

the intake ports (46A,46B) are broader in tumble-flow-side halves (46A-1,46B-1) thereof than in the other halves (46A-2,46B-2) and intake air flows through the respective intake ports (46A,46B) are off-centered toward a side of the tumble flow, whereby the intake air flows from the respective intake ports (46A,46B) can promote the tumble flow;

at least one of the intake ports (46A or 46B) is provided with a partition (21) to divide the interior thereof along the direction of a flow of a fluid therethrough into two sections, one being on a side of ignition means in the combustion chamber (30) and the other on a side opposite to the ignition means; and fuel feed means (12) for feeding fuel is arranged in the intake port (46A,46B), which is divided by the partition (21), on a side of the ignition means.

7. The intake port structure of claim 6, wherein the intake ports (46A,46B) are formed broader in the tumble-flow-side halves (46A-1,46B-1) than in the other halves (46A-2,46B-2) to have substantially triangular cross-sections, respectively.

8. The intake port structure of claim 6, wherein the intake ports (46A,46B) are formed broader in the tumble-flow-side halves (46A-1,46B-1) than in the other halves (46A-2,46B-2) to have cross-sections in the form of a baseball home plate, respectively.

9. The intake port structure of claim 6, wherein the intake ports (46A,46B) are formed broader in the tumble-flow-side halves (46A-1,46B-1) than in the other halves (46A-2,46B-2) to have tongue-shaped cross-sections, respectively.

10. The intake port structure of claim 6, wherein the intake ports (46A,46B) are each provided with the partition (21).

11. The intake port structure of claim 6, wherein some (46A) of the intake ports (46A,46B) are provided with the partition (21).

* * * * *